(12) United States Patent
Cornec et al.

(10) Patent No.: US 7,361,870 B2
(45) Date of Patent: Apr. 22, 2008

(54) SUPPLY GENERATOR FOR AN OSCILLATING CIRCUIT, PARTICULARLY FOR AN INDUCTION COOKING HOB

(75) Inventors: René Cornec, Challan (FR); Didier Gouardo, Saran (FR); Cédric Goumy, St Jean de la Ruelle (FR)

(73) Assignee: Fagorbrandt SAS, Rueil Malmaison (FR)

(*) Notice: Subject to any disclaimer, the term of this patent is extended or adjusted under 35 U.S.C. 154(b) by 0 days.

(21) Appl. No.: 10/542,859

(22) PCT Filed: Dec. 31, 2003

(86) PCT No.: PCT/FR03/03949

§ 371 (c)(1),
(2), (4) Date: Mar. 20, 2006

(87) PCT Pub. No.: WO2004/075387

PCT Pub. Date: Sep. 2, 2004

(65) Prior Publication Data

US 2006/0243723 A1 Nov. 2, 2006

(30) Foreign Application Priority Data

Jan. 21, 2003 (FR) .................................. 03 00613

(51) Int. Cl.
*H05B 6/04* (2006.01)
(52) U.S. Cl. ...................................... 219/660; 219/626
(58) Field of Classification Search ................ 219/660, 219/625, 626, 622, 664, 665, 676; 363/96, 363/97, 22; 315/224, 244, 307
See application file for complete search history.

(56) References Cited

U.S. PATENT DOCUMENTS 3,820,005 A * 6/1974 Steigerwald .................. 363/96

(Continued)

FOREIGN PATENT DOCUMENTS

GB  2 348 750  10/2000

OTHER PUBLICATIONS

Izaki K et al: "New Constant-Frequency Variable Powered Quasiresonant Inverter Topology Using Soft-Switched Type IGBTS for Induction-Heated Cooking Appliance With Active Power Filter" EPE '95: 6$^{TH}$. European Conference on Power Electronics and Applications. Sevilla, Sep. 19-21, 1995, European Conference on Power Electronics and Applications, Brussels, EPE Association, B, vol. 2 Conf. 6, Sep. 19, 1995, pp. 2129-2134, XP000537734.

(Continued)

*Primary Examiner*—Quang Van
(74) *Attorney, Agent, or Firm*—Young & Thompson

(57) ABSTRACT

A supply generator for an oscillating circuit, includes an inductance (L) and a resonant capacitor ($C_3$, $C_4$), for operation at a fixed frequency and also includes at least one pair of transistors ($I_2$, $I_2$), operated on a variable cyclic regime for modifying the power. The generator includes a first diode ($D_5$) between a first transistor ($I_2$) and the supply for the generator and a second diode ($D_4$) between the junction point of the inductance (L) and the resonant capacitor ($C_3$, C4) and the junction point of the first transistor ($I_2$) and the first diode ($D_5$). The invention is of particular use for supply of the cooking rings on an induction cooking hob.

6 Claims, 6 Drawing Sheets

U.S. PATENT DOCUMENTS 3,898,410 A * 8/1975 Peters, Jr. .................. 219/626
5,841,646 A * 11/1998 Cornec .................... 363/56.08
6,727,482 B2 * 4/2004 Bassill et al. ............... 219/625

OTHER PUBLICATIONS

Dieckerhoff S et al: "Design of an IGBT-based LCL-resonant inverter for high-frequency induction heating" Industry Applications Conference, 1999. Thirty-Fourth IAS Annual Meeting. Conference Record of the 1999 IEEE Phoenix, AZ, USA Oct. 3-7, 1999, Piscataway, NJ, USA, IEEE, US, Oct. 3, 1999, pp. 2039-2045, XP010355091 ISBN: 0-7803-5589-X.

Ogiwara H et al: "High frequency induction heating load resonant inverter with voltage-clamped quasi-resonant switched using newly-improved static induction transistors/thyristors and their phase shifted controlled scheme" Proceedings of the Industry Applications Society Annual Meeting. Houston, Oct. 4-9, 1992, New York, IEEE, US, vol. 1, pp. 941-948, XP010063657 ISBN: 0-7803-0635-X.

* cited by examiner

SUPPLY GENERATOR FOR AN OSCILLATING CIRCUIT, PARTICULARLY FOR AN INDUCTION COOKING HOB

The present invention relates to a supply generator for an oscillatory circuit.

It also relates to a set of such generators and to an induction cooking hob comprising a plurality of generators of the invention.

The present invention is aimed generally at induction heating systems, in particular cooking hobs comprising a plurality of induction cooking rings supplied by respective generators.

These induction cooking hobs necessitate the generation in the container or material to be heated of a current at a high frequency, of the order of 20 to 50 kHz.

In the conventional way, this current is created by a magnetic field produced by an inductor coupled to a power generator.

That power generator is generally a resonant generator, as shown in FIG. 1.

That power generator is supplied with power from the electrical mains supply at a rectified and filtered supply voltage E.

Thus each cooking ring F, comprising an inductor and a resistive load R consisting in particular of the container to be heated, is associated with resonant capacitors $C_3$, $C_4$ to form a circuit resonating at an angular frequency $\omega$ such that $L(C_3+C_4)\omega^2=1$.

The greater the combination of the chopping frequency and the generator power, the higher the resonance.

In induction systems, this is the case in particular when the chopping frequency is at least 20 kHz and the power of the generator is of the order of 3 kW.

The use of these resonant generators enables a maximum power to be transmitted to an inductive load at the resonant frequency of the supply system.

To prevent overheating of the semiconductors, it is possible to operate the semiconductors of these power generators with zero switching losses.

Accordingly, in the conventional way, a soft switching mode in which switching occurs at the zero voltage crossing of the transistors $I_1$, $I_2$ is obtained by providing the transistors $I_1$, $I_2$ with diodes $D_1$, $D_2$ and capacitors $C_1$, $C_2$ in the usual way.

To preserve these soft switching modes, the generator power is generally adjusted by adjusting the operating frequency around the resonant frequency.

Power modulation by varying the operating frequency of the generator in this way has many drawbacks, however.

In particular, the frequency range in which the generator operating frequency must be varied is relatively wide if the modulated power is required to vary in a wide range (for example in a ratio from 1 to 10).

Furthermore, if a plurality of resonant generators are operating in parallel, it is impossible to synchronize them if it is required to retain the possibility of independent power modulation.

Intermodulation noise is then generated between the generators operating close together at different frequencies.

One example of the above type of soft switching resonant generator is disclosed in the document FR 2 792 157 in particular.

That document describes a solution in which a plurality of inductors may be controlled by the same voltage and at the same frequency but with a duty cycle that may be adjusted using the pulse width modulation (PWM) technique well known in the art.

However, in the document FR 2 792 157, this mode of operation necessitates the use of particular structures introducing the concept of a master generator and slave generators whose operation is linked to the operation of the master generator.

This type of structure is not very suitable for a set of induction cooking rings in which each of the rings must operate independently, without a master and one or more slaves being defined.

An object of the present invention is to eliminate the drawbacks cited above and to propose a supply generator for an oscillatory circuit allowing power modulation with a high power ratio at a fixed frequency.

To this end, the present invention is aimed firstly at a supply generator for an oscillatory circuit comprising an inductor and a resonant capacitor adapted to operate at a fixed frequency and comprising at least one pair of transistors controlled at a variable duty cycle to modify the power.

According to the invention, the generator comprises a first diode between a first transistor of the pair and the supply of the generator and a second diode between the connection point of the inductor and the resonant capacitor and the connection point of the first transistor and the first diode.

Thanks to this particular arrangement, the operating phase of the generator in which the second diode conducts is relatively short.

This operating phase, corresponding to linear operation of the generator, is therefore very short in relation to the resonant operation of the generator, with the result that the latter's output power may be maximized.

According to a preferred feature of the invention, the transistors are associated with diodes and capacitors adapted to operate the generator in a soft switching mode.

There is obtained in this way a supply generator operating at a fixed frequency, at resonance in order to obtain maximum power in an inductive load, and in the zero voltage switch (ZVS) soft switching mode in which switching occurs at zero voltage and at the nominal current.

This switching mode prevents excessive heating in the semiconductors constituting the power generator.

The present invention is also aimed at a set of supply generators according to the invention said generators being synchronized in frequency and controlled at different duty cycles.

Finally, the present invention is further aimed at an induction cooking hob comprising a plurality of inductors adapted to constitute one or more cooking rings of said hob.

According to the invention, each inductor is associated with a supply generator in accordance with the invention, said generators being synchronized in frequency and adapted to be controlled independently of each other with a variable duty cycle.

Other features and advantages of the invention will become further apparent in the course of the following description.

In the appended drawings, which are given by way of non-limiting example:

Figure 2:
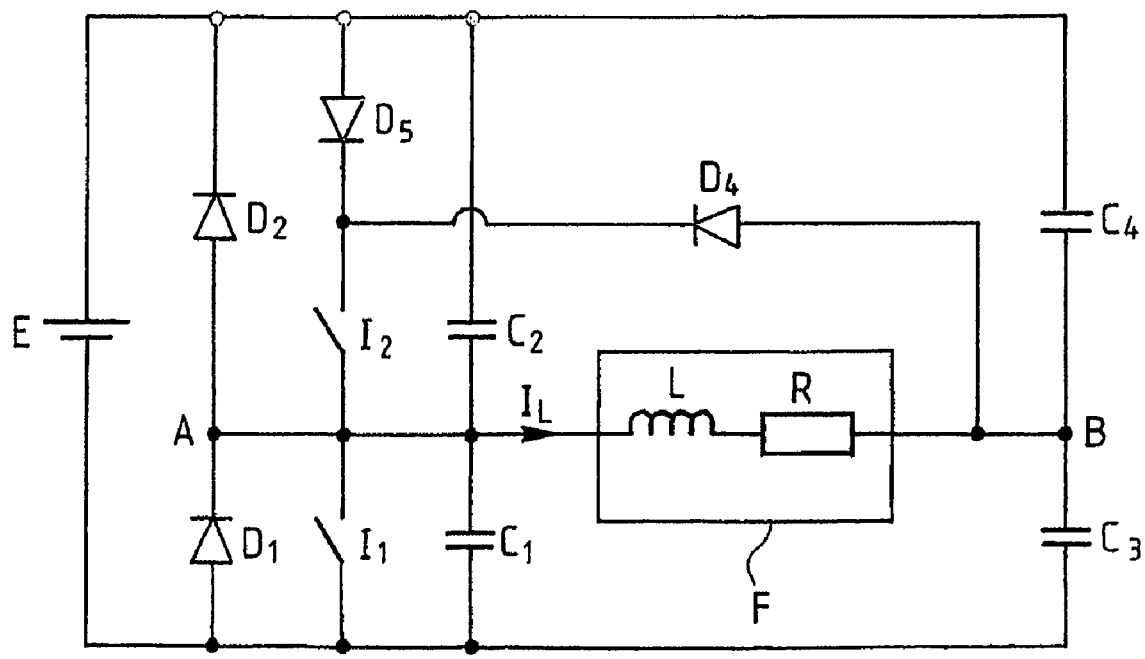
FIG. 2 is an electrical circuit diagram of a first embodiment of a power generator of the invention.

An electrical circuit of a first embodiment of a supply generator of the invention is described first with reference to FIG. 2.

That generator includes two transistors $I_1$, $I_2$ in a half-bridge configuration and supplied at a voltage E corresponding to the rectified and filtered voltage of the mains electrical power supply.

In the conventional way, these transistors $I_1$, $I_2$ are associated with diodes $D_1$, $D_2$ and capacitors $C_1$, $C_2$ in a configuration allowing switching in the zero voltage switching (ZVS) mode, which is a soft switching mode in which switching occurs at the zero crossing of the voltage.

The oscillatory circuit supplied by the transistors $I_1$, $I_2$ consists of an inductor L and resonant capacitors $C_3$, $C_4$.

This type of resonant generator transmits maximum power to inductive loads of the L, R type such as are found in induction cooking rings, in which the load consists of an inductor and a container to be heated.

For example, L may have a value of the order of 50 µH and the resonant capacitors $C_3$, $C_4$ may have a value of 680 nF.

According to the invention, a first diode $D_5$ is connected in series with one of the transistors of the half-bridge, here, by way of non-limiting example, the transistor $I_2$.

This first diode $D_5$ is therefore connected between the transistor $I_2$ and the supply voltage E of the generator.

A second diode $D_4$ is connected in parallel with a resonant capacitor $C_4$.

This second diode $D_4$ is therefore connected between the connection between the inductor L and the resonant capacitor $C_4$ and the connection between the transistor $I_2$ and the first diode $D_5$.

The diodes $D_4$, $D_5$ are connected so that the cathode of the second diode $D_4$ is connected to the cathode of the first diode $D_5$.

Of course, an equivalent circuit could be obtained by connecting a diode in series with the other transistor $I_1$ of the half-bridge and a diode across the other resonant capacitor $C_3$.

The operation of a generator of the above kind controlled by control means that are not shown is described next with reference to FIGS. 3, 4 and 5.

Those figures show in continuous line the voltage as a function of time at the point A of the FIG. 2 circuit, i.e. the voltage across the transistors $I_1$, $I_2$.

The dashed line curve shows the current $I_L$ flowing in the inductive load F and the chain-dotted curve shows the voltage at the point B of the circuit, i.e. across the resonant capacitors $C_3$, $C_4$.

Figure 3:
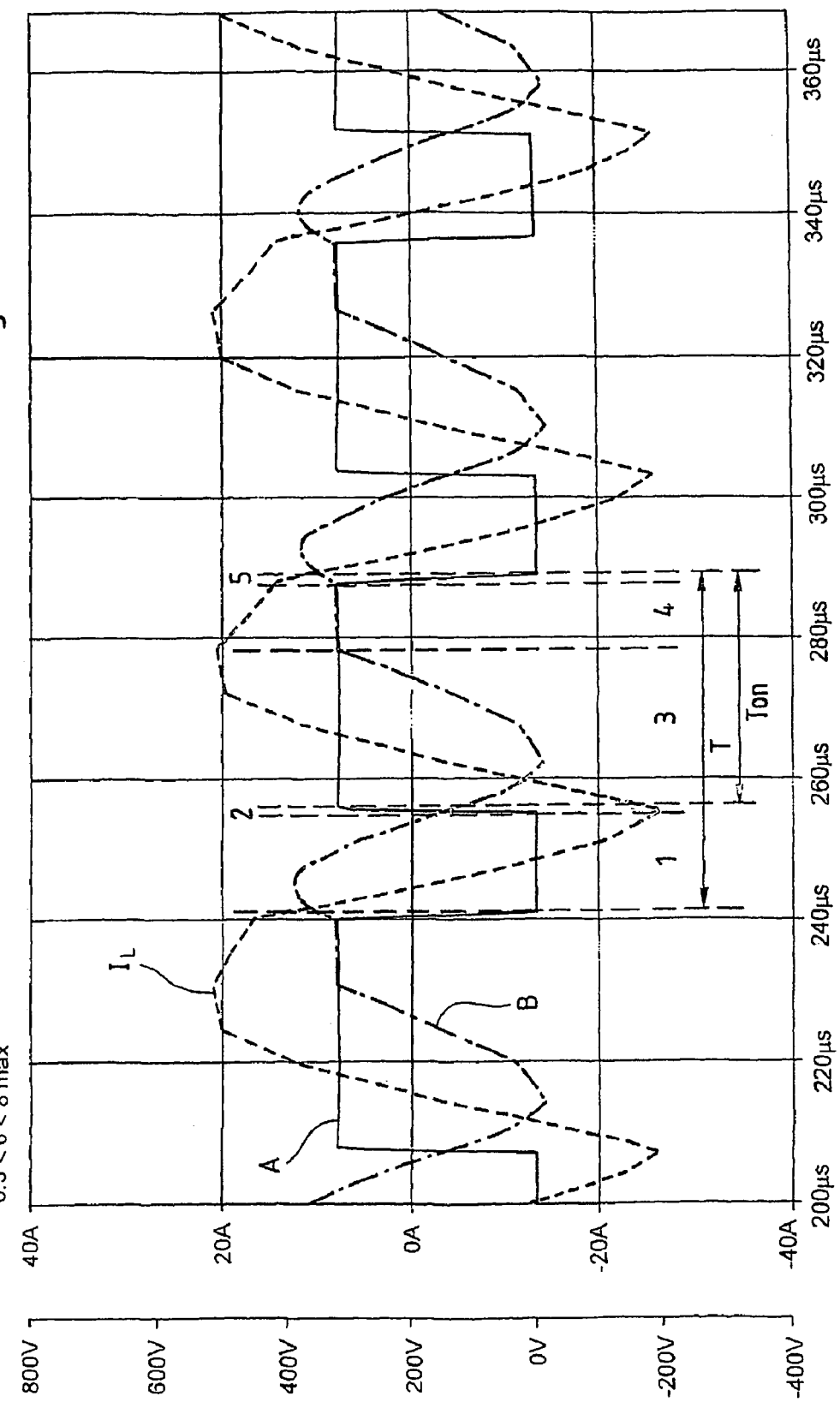
FIGS. 3, 4 and 5 are curves showing for different duty cycles the values of the voltages and the currents at various points of the FIG. 2 electrical circuit.
Figure 4:
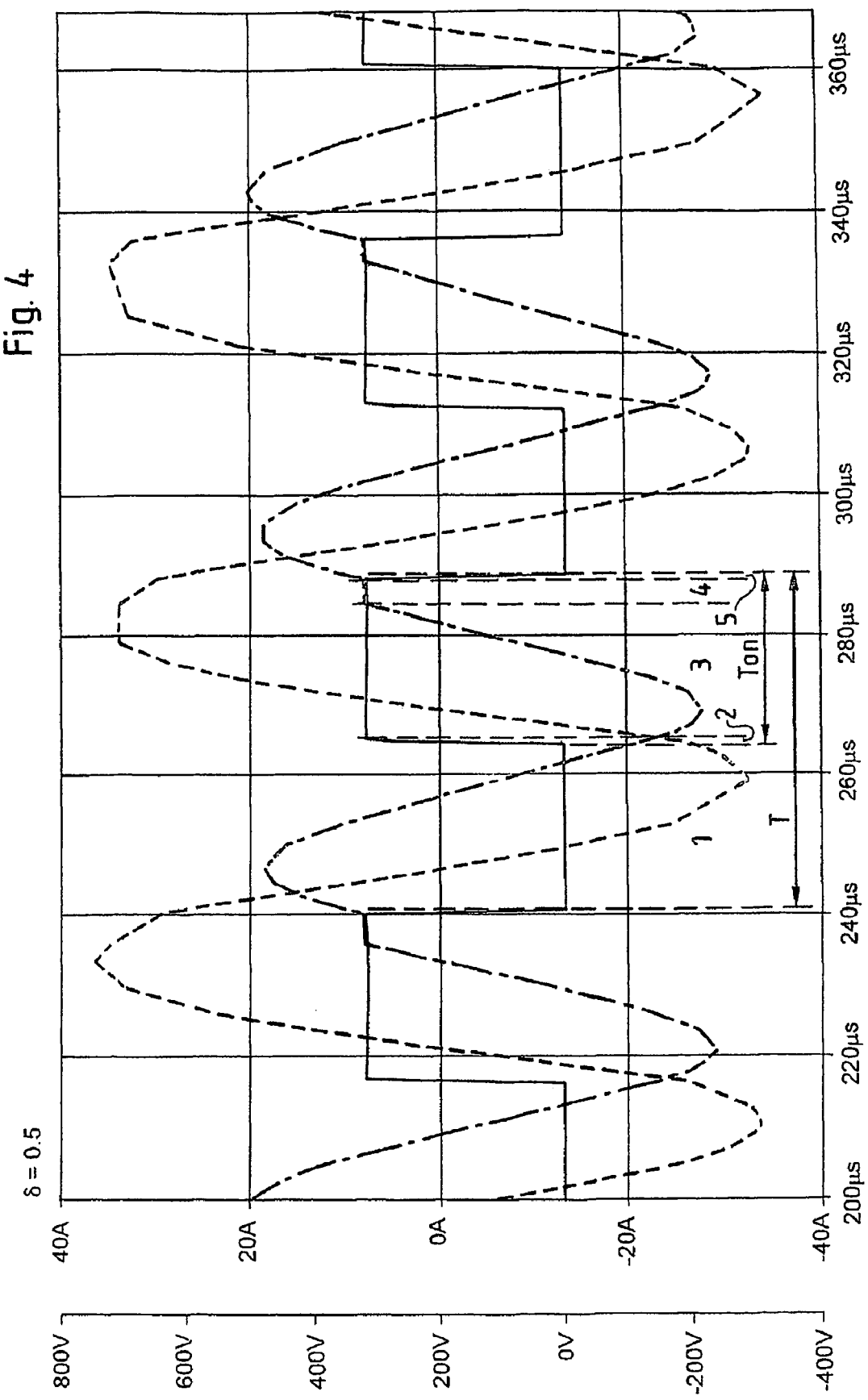
Figure 5:
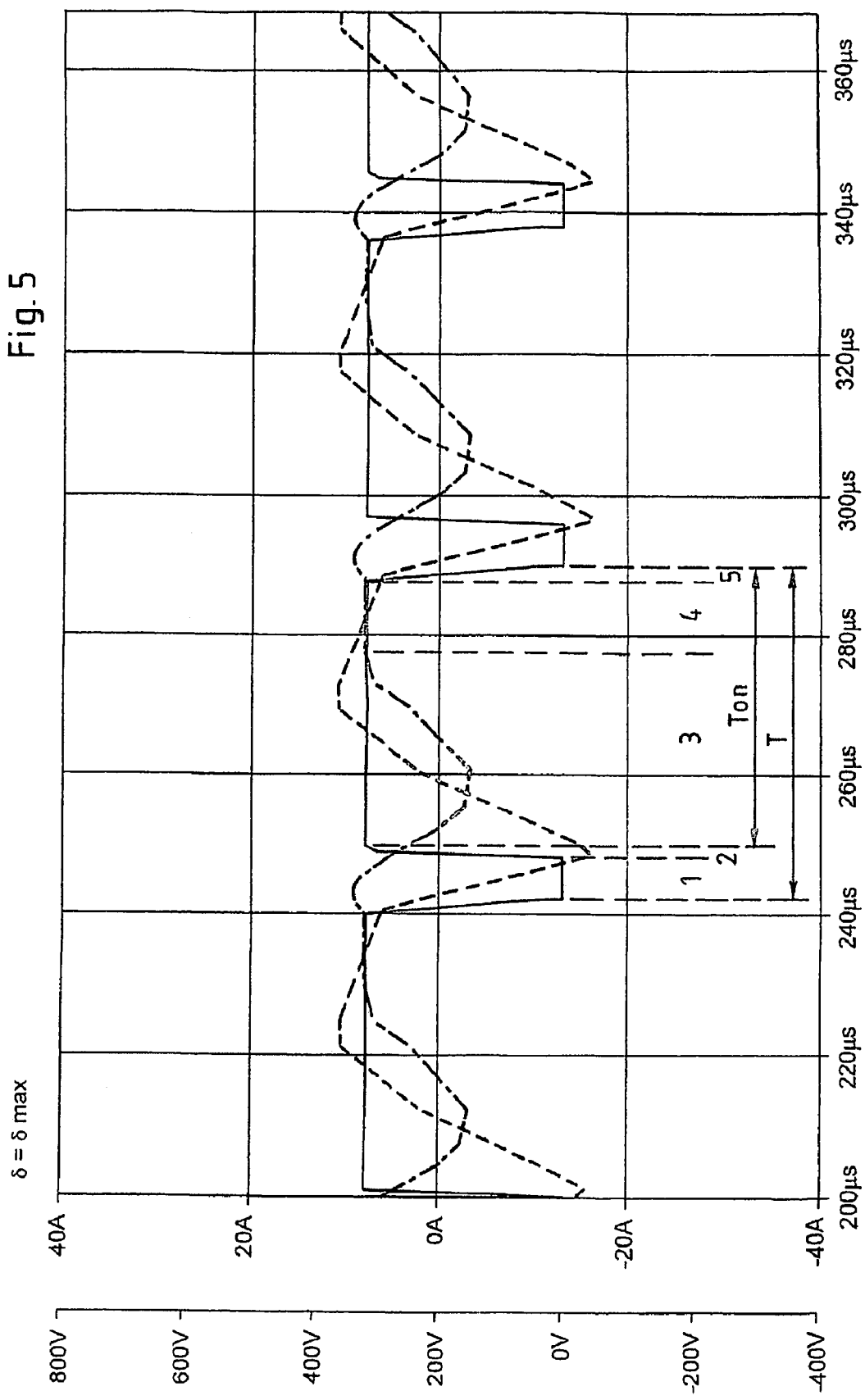

The voltage at the point A is a supply voltage at a fixed frequency, with the result that the period T of repetition of the signals is identical in the three curves of FIGS. 3 to 5.

The period $T_{on}$ is the time for which the transistor $I_2$ connected in series with the first diode $D_5$ conducts.

The power delivered can therefore be varied by modifying the duty cycle δ corresponding to the ratio of the time $T_{on}$ to the signal repetition period T.

This duty cycle δ can vary from 0.5 (see FIG. 4), at which the power is at a maximum, to a value δmax (see FIG. 5) at which the power is at a minimum.

This value δmax may typically be from 0.8 to 0.9.

Thus the power is modulated by modulating the period $T_{on}$, i.e. the time for which the transistor $I_2$ conducts, and keeping the period of the signals T constant.

Five distinct phases, numbered 1 to 5 in the figures, can therefore be distinguished over each period T of operation:

Phase 1

The transistor $I_1$ conducts. The current $I_L$ in the inductive load decreases and the resonant capacitors $C_3$, $C_4$ are discharged in resonant mode.

Phase 2

The control circuit then turns off the transistor $I_1$. The current $I_L$ then charges the capacitors $C_1$, $C_2$ until the diode $D_2$ conducts, the voltage across the transistors $I_1$, $I_2$ increasing slowly during switching by the ZVS soft switching circuit.

During this phase, the resonant mode formed by the current $I_L$ and the resonant capacitors $C_3$, $C_4$ continues.

Phase 3

The diode $D_2$ conducts and then the transistor $I_2$ also conducts. The resonant capacitors $C_3$, $C_4$ are discharged in resonant mode with the result that the voltage at the point B rises to a value sufficient to cause conduction in the second diode $D_4$.

Phase 4

The diode $D_4$ conducts, with the result that the current $I_L$ no longer flows in the resonant capacitors $C_3$, $C_4$. The current $I_L$ is discharged slowly into the short circuit consisting of the second diode $D_4$ and the transistor $I_2$, which continues to conduct.

This discharge occurs exponentially and not in resonant mode, and the value of the voltage at the point B remains equal to the value of the supply voltage E.

Note that, during this phase 4, the current $I_L$ decreases more slowly than in the resonant mode, the current $I_L$ decreasing with a slope proportional to L/R.

Accordingly, at the end of this phase 4, the value of the current $I_L$ remains positive, with the result that it is possible to turn off the transistor $I_2$ using a soft switching mode.

Phase 5

The transistor $I_2$ is turned off and, in an analogous manner to phase 2, there is a slow decrease in the voltage across the transistors $I_1$, $I_2$ in the ZVS switching mode.

The first diode $D_5$ is turned off and then the second diode $D_4$ is also turned off, with the result that the voltage B across the resonant capacitors $C_3$, $C_4$ increases to a value greater than the value of the supply voltage E.

This phase 5 then leads to a new phase 1 of a new period T.

The above operation is exactly the same regardless of the ratio δ selected.

Figure 1:
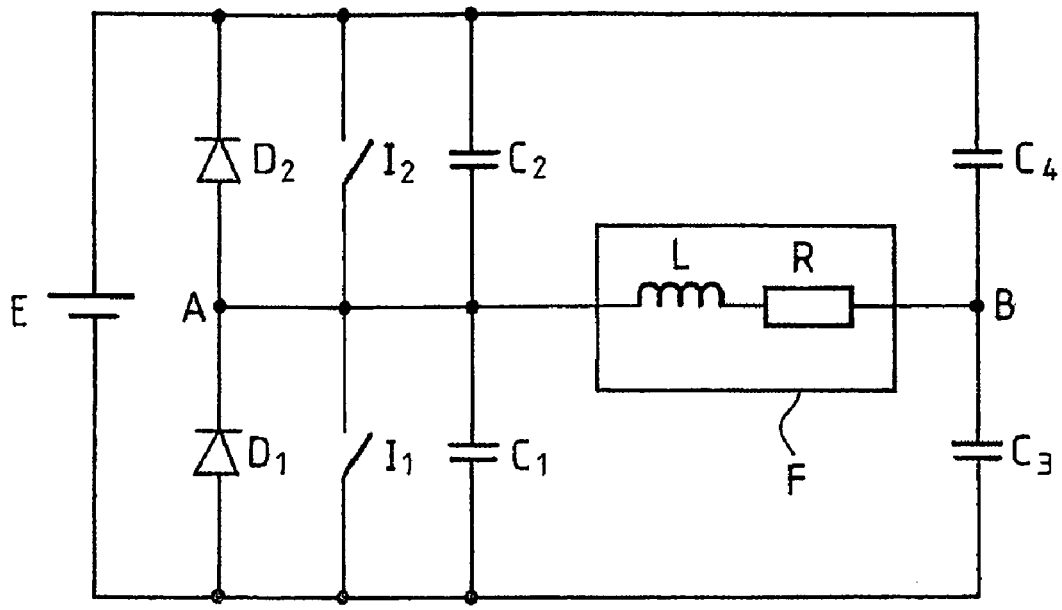
FIG. 1 is an electrical circuit diagram of a prior art supply generator described hereinabove.

In particular, in FIG. 4, at maximum power, when δ is equal to 0.5, the current $I_L$ flowing in the load is very high, with the result that the power output is at a maximum. In particular, the power delivered by the generator may be very close to that obtained at the resonant frequency with a conventional circuit as shown in FIG. 1. The power reduction caused by the quasiresonant operation of the generator is of the order of only 25% to 30%.

Furthermore, the phase 4 during which the second diode $D_4$ conducts is very short.

On the other hand, in FIG. 5, when the value of the ratio δ is at a maximum, a relatively low current $I_L$ is obtained, corresponding to a minimum power delivered by the generator.

It is nevertheless seen that, even in this mode of operation, the current $I_L$ remains sufficiently high at the beginning of phases 2 and 5 to preserve the ZVS soft switching mode and in particular remains sufficiently high to discharge the capacitors $C_1$, $C_2$ during the switching phases.

Accordingly, this electrical circuit operates at full power in a quasiresonant mode adapted to the inductive loads L, R.

It is possible to operate the generator at a fixed frequency by modulating the power by modifying the bandwidth.

The modulation depth, from $\delta=0.5$ to $\delta=\delta max$, is relatively high and corresponds to a power ratio of 1 to 7.

Furthermore, whatever the duty cycle $\delta$ selected, the soft switching mode is preserved by the low decrease in the current $I_L$ in the circuit.

Of course, the present invention is not limited to the circuit example shown in FIG. 2.

Figure 6:
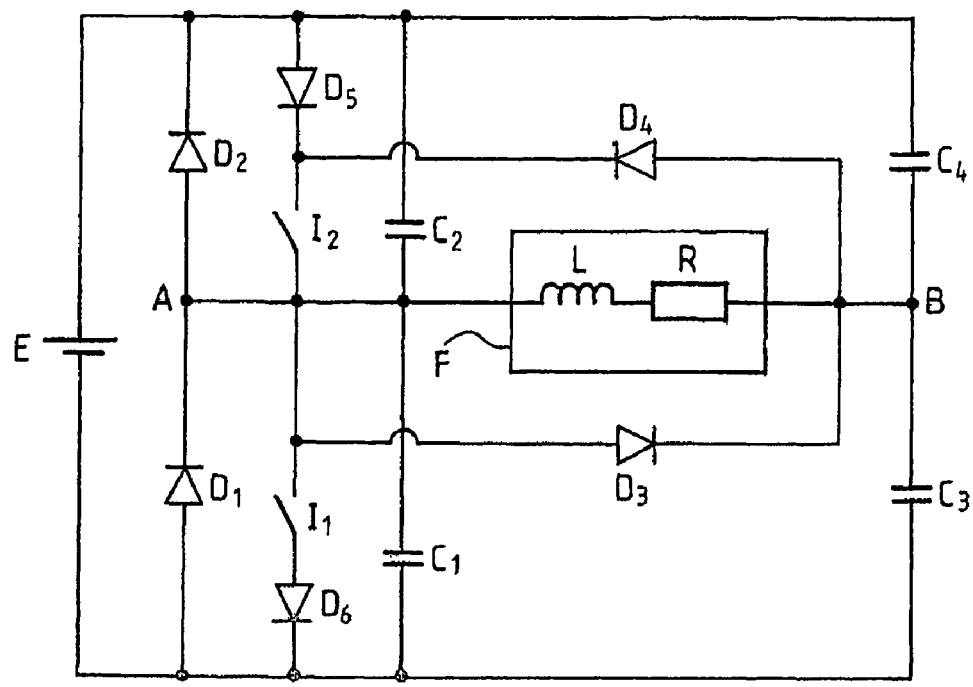
FIG. 6 is an electrical circuit diagram of a second embodiment of a supply generator of the invention.

In particular, it applies identically to the electrical circuit of FIG. 6, which shows a second embodiment of the invention.

In this embodiment, a third diode $D_6$ and a fourth diode $D_3$, respectively analogous to the first diode $D_5$ and the second diode $D_4$, are added to the second branch of the half-bridge, with the result that the third diode $D_6$ is in series with the other transistor $I_1$.

The operation of the resonant generator therefore includes two linear phases, one when the current $I_L$ is positive and the other when the current $I_L$ is negative.

Figure 7:
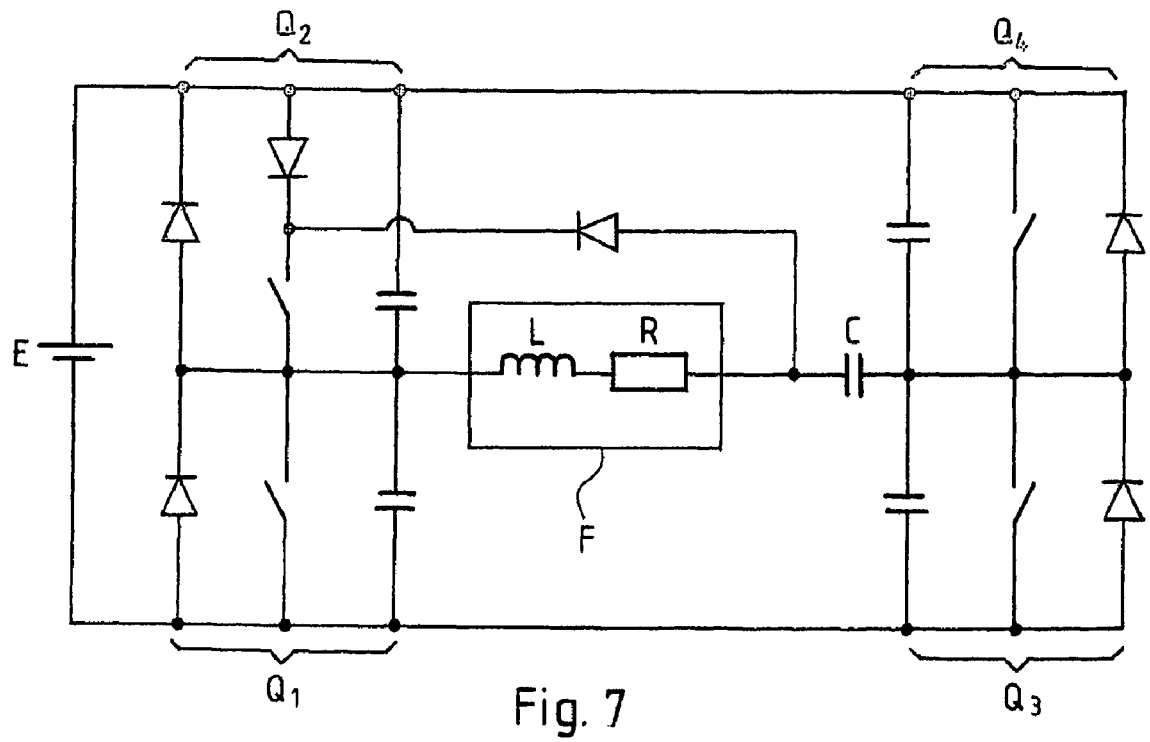
FIG. 7 is an electrical circuit diagram of a third embodiment of a supply generator of the invention.

Moreover, as shown in FIG. 7, it may be beneficial to replace the half-bridge by a complete bridge including four transistors $Q_1$, $Q_2$, $Q_3$, $Q_4$.

This circuit can offer particularly high performance if the voltages used are very high, for example of the order of 3000 V, in which case the power delivered by the generator can be as much as 300 kW to 400 kW.

Of course, although there is shown here the supply of power to a cooking ring F in the form of an inductive load L, R, this type of generator could equally be used to supply a winding of a transformer.

Moreover, thanks to the capacitors $C_1$, $C_2$, the soft switching circuit of the transistors $I_1$, $I_2$ could also be eliminated provided that the semiconductors are able to withstand hard switching.

Figure 8:
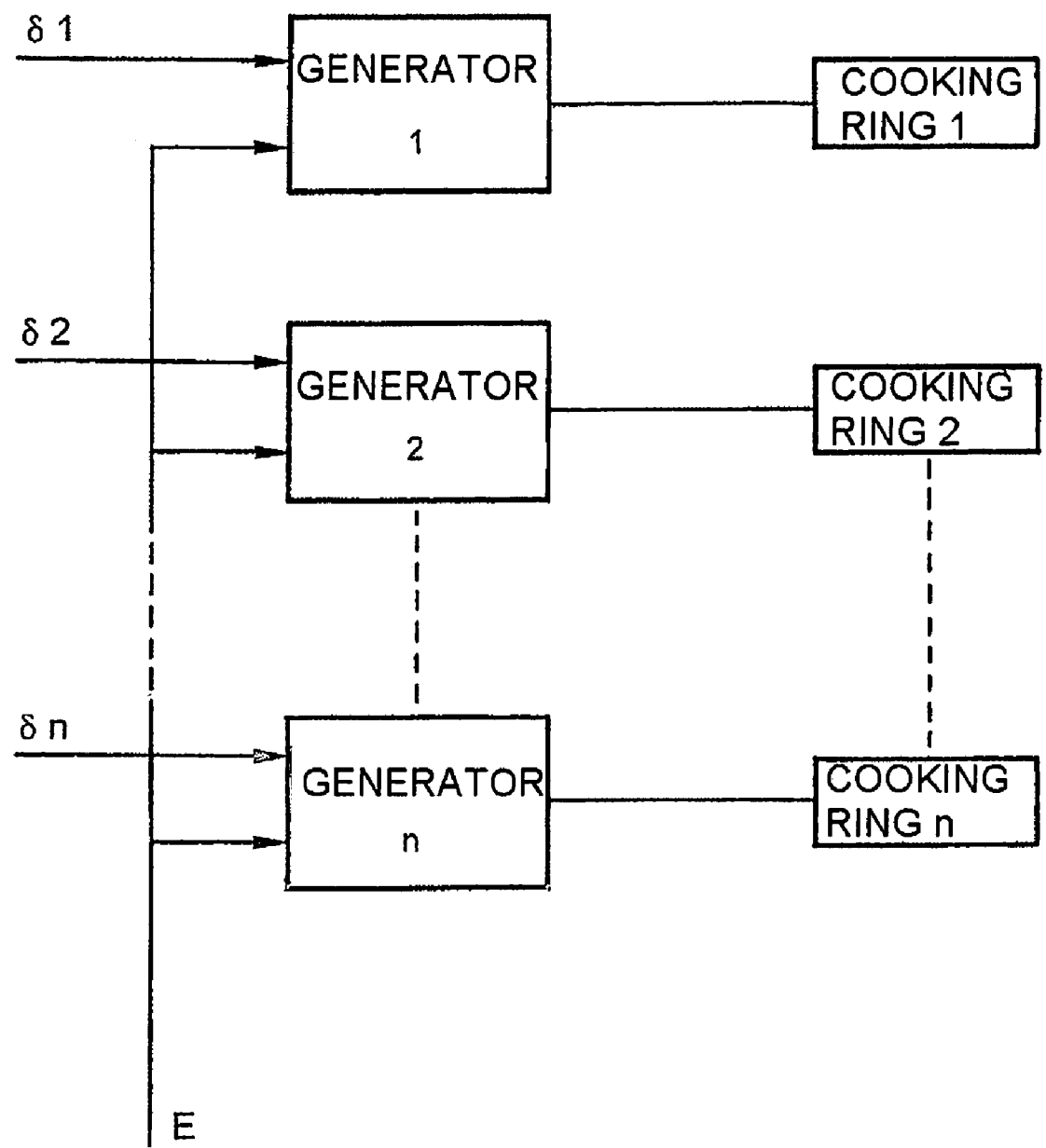
FIG. 8 is a block diagram of a set of supply generators of the invention.

As shown in FIG. 8, the resonant generator of the invention is particularly well adapted to supply a plurality of cooking rings in parallel.

The generators can therefore be synchronized in frequency whilst operating with different duty cycles ($\delta_1$, $\delta_2$, ... $\delta_n$), with the result that the powers transmitted to the cooking rings may be adjusted independently of each other.

This type of generator is well adapted to supplying a plurality of cooking rings in the same induction cooking hob, in particular a cooking hob consisting of a large number of inductors in a matrix arrangement in the hob.

The invention claimed is:

1. Supply generator for an oscillatory circuit comprising an inductor (L) and a resonant capacitor ($C_3$, $C_4$) adapted to operate at a fixed frequency and comprising at least one pair of transistors ($I_1$, $I_2$) controlled at a variable duty cycle ($\delta$) to modify the power, characterized in that it comprises a first diode ($D_5$) between a first transistor ($I_2$) of said pair and a rectified power supply of said generator and a second diode ($D_4$) between the connection point of the inductor (L) and the resonant capacitor ($C_3$, $C_4$) and the connection point of said first transistor ($I_2$) and said first diode ($D_5$).

2. Generator according to claim 1, characterized in that said transistors ($I_1$, $I_2$) are associated with diodes ($D_1$, $D_2$) and capacitors ($C_1$, $C_2$) adapted to operate said generator in a soft switching mode.

3. Generator according to claim 2, characterized in that it is adapted to switch at the zero crossing of the voltage.

4. Generator according to claim 1, characterized in that it comprises a third diode ($D_6$) between a second transistor ($I_1$) of said pair and the supply of said generator and a fourth diode ($D_3$) between the connection point of the inductor (L) and the resonant capacitor ($C_3$, $C_4$) and the connection point of said second transistor ($I_1$) and said third diode ($D_6$).

5. Set of supply generators each of which is a generator according to claim 1, characterized in that said generators are synchronized in frequency and controlled at different duty cycles ($\delta_1$, $\delta_2$, ... $\delta_n$).

6. Induction cooking hob comprising a plurality of inductors adapted to constitute one or more cooking rings, characterized in that said inductors are associated with respective supply generators each of which is a generator according to claim 1, said generators being synchronized in frequency and adapted to be controlled independently of each other with a variable duty cycle.

* * * * *